United States Patent [19]

Braschler et al.

[11] Patent Number: 4,755,947
[45] Date of Patent: Jul. 5, 1988

[54] MONITOR FOR AND METHOD OF DEPLOYING ANCHOR LINES FOR OFF SHORE PLATFORMS

[75] Inventors: Steve A. Braschler; Fredrick G. Hougland, both of Coffeyville, Kans.

[73] Assignee: Parmac, Inc., Coffeyville, Kans.

[21] Appl. No.: 835,728

[22] Filed: Mar. 3, 1986

[51] Int. Cl.⁴ .................... G05D 15/01; G06F 15/46; B63B 21/50

[52] U.S. Cl. .................... 364/432; 364/139; 364/550; 405/158; 405/166; 405/168

[58] Field of Search ............... 364/424, 432, 449, 550, 364/138, 139; 405/154, 158, 160, 165, 166, 168, 177

[56] References Cited

U.S. PATENT DOCUMENTS

| | | | |
|---|---|---|---|
| 3,893,404 | 7/1975 | Chandler et al. | 405/160 |
| 4,150,911 | 4/1979 | Droste et al. | 405/177 |
| 4,238,824 | 12/1980 | De Matte et al. | 364/449 |
| 4,260,287 | 4/1981 | Uyeda et al. | 405/168 |
| 4,388,710 | 6/1983 | Pecon, Jr. | 405/168 |

OTHER PUBLICATIONS

Brown: Aerospace Systems Aid Subsea Laying, The Oil and Gas Journal Oct. 14, 1974, pp. 71–73, 79,80.
Willems et al.: Automatic Winch Control used on Lay Barge, The Oil and Gas Journal Sep. 22, 1975, pp. 100–102, 107.
Suzuki et al.: New Cable Ship Kuroshio Maru. Japan Telecommunications Review, vol. 17, No. 4, pp. 302–310, Oct. 1975.

Primary Examiner—Felix D. Gruber
Attorney, Agent, or Firm—Head & Johnson

[57] ABSTRACT

A method and apparatus, utilizing a computer are utilized to control the placement of an anchor, and its associated anchor line for proper payout, deployment and ultimate placement of the anchor, depending upon the contour of the sea bottom and to maintain a desired catenary curvature that prevents the anchor line from dragging the sea bottom and further prevents undue strain upon the anchor chain beyond its safe tension force.

18 Claims, 8 Drawing Sheets

| | A | B | C | D | E | F | G |
|---|---|---|---|---|---|---|---|
| LENGTH (FT) | 1000 | 1500 | 2500 | 3000 | 3500 | 4000 | 4344 |
| CHAIN (FPM) | 500 | 500 | 500 | 500 | 500 | 500 | 500 |
| BOAT (FPM) | 330 | 414 | 189 | 508 | 351 | 330 | 270 |
| OFFBOT (FT) | 1162 | 1032 | 575 | 478 | 318 | 149 | 15 |
| TENSION (LBS) | 40,000 | 62,000 | 97,000 | 119,600 | 140,000 | 160,000 | 173,000 |
| DISTANCE (FT) | 661 | 1075 | 1453 | 1962 | 2313 | 2644 | 2830 |
| LENGTH TO GO (FT) | 4000 | 3500 | 2500 | 2000 | 1500 | 1000 | 655 |

MONITOR FOR AND METHOD OF DEPLOYING ANCHOR LINES FOR OFF SHORE PLATFORMS

BACKGROUND

This invention is directed to the anchoring of offshore platforms and vessels ("vessels" herein) such as, but not limited to floating or semi-submersible types. In particular, the invention is directed to method and apparatus for deploying a plurality of anchors and anchor lines for such offshore vessels. A typical offshore drilling vessel is moored in position by the use of eight or more anchors and associated anchor lines. The anchors are deployed in a spread pattern to resist the environmental forces of wind, wave, and currents tending to move the vessel off of its desired location. The final location of each anchor is by no means insignificant. The location and holding power of the anchor and the length and breaking strength of the anchor line must be designed to take into effect the potential environmental fores to be encountered. A drilling rig is connected to the sea bottom by a riser tube, hence a vessel is limited to the horizontal distance it may move off the well location to avoid bending the riser tube, and/or exceeding the breaking strength of the anchor line.

In substantially deep water, the deployment of an anchor from an offshore vessel requires a workboat of extensive horsepower plus other power sources and equipment such as a winch or windlass which take and retain the anchor on board. The anchor end may be connected to the winch by a wire pendant line. The remaining anchor line consists of a chain, wire line or combination of both connected at the working end to the anchor and at its 'bitter end' to the vessel via an anchor windlass. The purpose of the workboat is to take the anchor to a predetermined location from the offshore vessel which is typically marked by an anchoring buoy. As the workboat proceeds toward the location, the anchor line is run out or payed out by the windlass located on the offshore vessel. The payout of the anchor line is controlled by some form of a brake or retarding device also operated by the windlass operator. Typical of such brakes are water brakes registered as are manufactured by Parmac, Inc. under the trademark "Hydromatic". When the workboat reaches the desired anchor buoy or anchor location, additional payout of the anchor line is stopped. While maintaining the anchor position, the workboat lowers the anchor to the bottom by the use of its winch and the anchor pendant line. The anchor marking buoy is then attached to the end of the pendant line by the workboat crew. Once the anchor has reached bottom, the windlass operator hauls in or pulls in on the anchor line with the windlass to set the anchor and place the desired amount of tension and scope to the line.

A typical windlass is mounted on two pivot points on the offshore vessel with a load measuring device installed between a third mounting point and the windlass. The load measuring device consists of a hydraulic or electronic device capable of sensing the tension applied to the anchor line by the windlass. A load or tension indicator is connected to the load measuring device and is located in the windlass operator's cab. One such complete windlass operating system, including the cab is located at each corner of the offshore vessel. Also installed in connection with the windlass is a mechanical or electronic length measuring device with a digital indicator located in the windlass operator's control cab. Additional instrumentation located in the operator's cab includes an indicator of the payout speed of the anchor line and the anchor line length still on board the vessel.

The deployment of the anchor and its associated chain and/or wire line involves several problems, the most important of which is to maintain the anchor line from dragging the bottom. The drag of the anchor line or friction on the bottom surface increases the bollard pull to a point where the workboat can become stalled in the water. In addition, it is not at all uncommon to find submerged objects, such as pipelines, well equipment, treating equipment at the bottom of the sea, that is to be avoided by the anchor line due to the damage or entanglement that may result. As such, the windlass operator has no way to determine where the anchor line is located in the water since he cannot visually see the line or the bottom. The tension indicator, previously described, will change abruptly whenever the anchor line touches bottom, but only afterward and not before. The workboat Captain must rely primarily on the workboat speed indicator and throttle sections as an indication of the bollard pull. In addition, his own personal 'feel' of the boat provides indications to him of the vertical load and the bollard pull relative to the tension created from the anchor line.

Prior to setting the anchor, the water depth at the anchor and at the rig site is usually known, and maps are provided to show the contour of the sea bed between the well site and the anchor. Despite the fact that the windlass operator has knowledge of the bearings of the anchor as to its distance and location and depth of water, he still is unable to determine the actual profile of the anchor line is positioned in the water.

SUMMARY

A primary objective of the invention is to provide a method and apparatus for controlling the placement of an anchor and its associated anchor line, which control and apparatus can be located in the windlass operator's cab to provide information for the proper payout, deployment and ultimate placement of the anchor.

A further object of the invention is to provide a method and apparatus for controlling the placement of an anchor and its associated anchor line from a floating or semi-submersible vessel or object situated in the ocean utilizing an anchor handling support vessel or workboat and with the aid of a digital computer. The digital computer is provided with a data base that includes the location of the anchor drop point from the vessel and the depth of the ocean bottom therebetween. The tension upon the anchor line is constantly monitored along with the length of the anchor line payed out. This information is monitored and provided to the computer which repetitively calculates at desired intervals the catenary curvature of the anchor chain at each of said intervals. As a result therefrom, the operator can control the speed of payout of the anchor line to maintain a desired catenary curvature thereof that prevents the anchor line from dragging the sea bottom and further prevent undue strain upon the anchor chain, the vessel and the bollard pull upon the workboat or support vessel.

The apparatus involved includes a monitor having a visual display such as a cathode ray tube, light emitting diodes and/or liquid crystal displays connected with a microprocessor or computer connected to the windlass or winch measuring devices. The measuring devices include a tension device or load cell connected between the vessel and the windlass platform, a line length counter and line speed or line speed tachometer all of which are capable of transmitting an electrical signal, such as voltage or current proportional to the force, length or speed being measured. The catenary mathematical equations of an anchor line suspended between the vessel and a workboat can be determined from the values of tension and line length played out or can be determined from measurements of the distance between the workboat and the offshore vessel and line length payed out.

DETAILED DESCRIPTION

Before explaining the present invention is detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Figure 1:
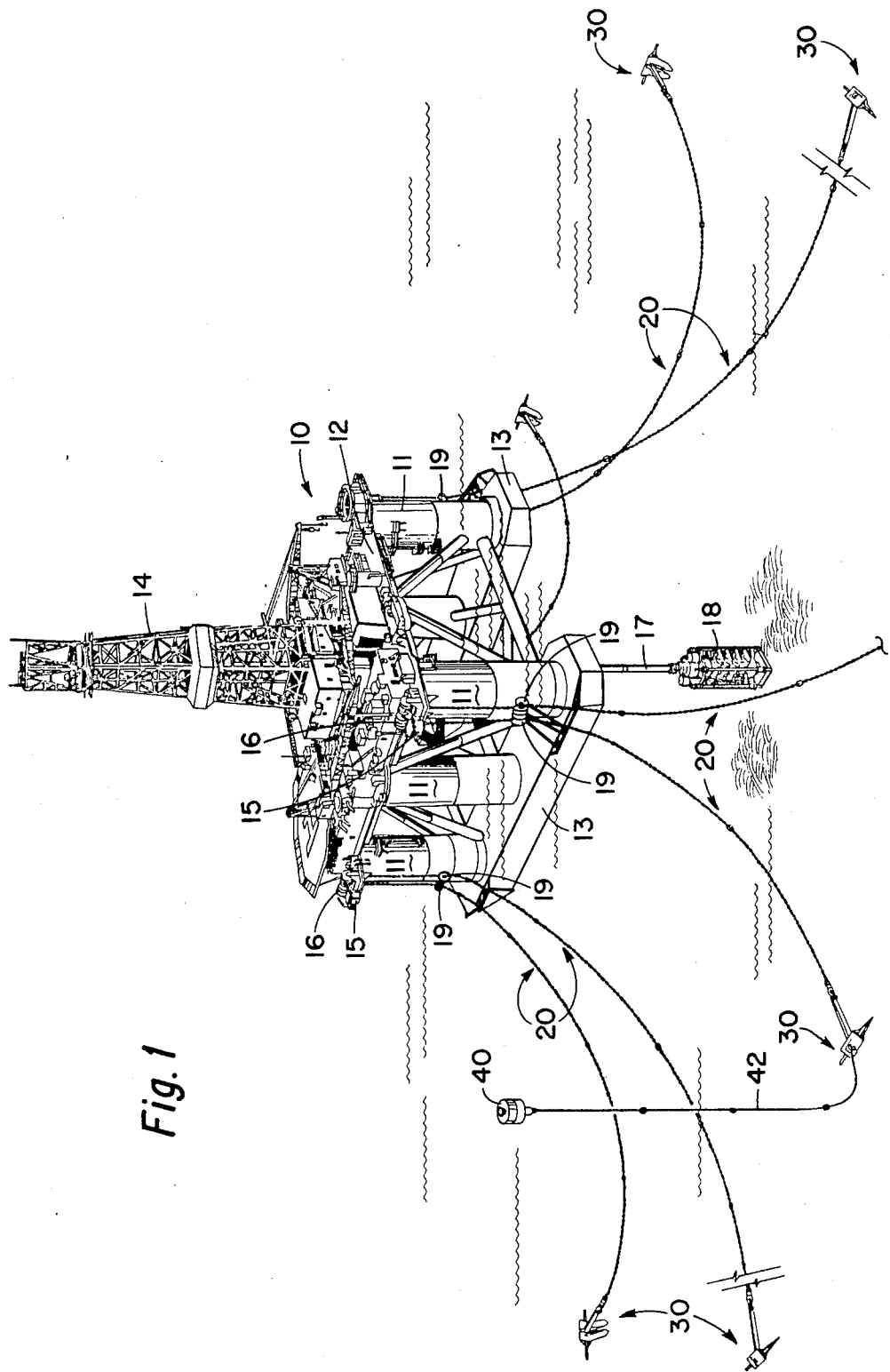
FIG. 1 is a perspective view of a semi-submersible offshore platform depicting the anchoring system therefor.
Figure 8:
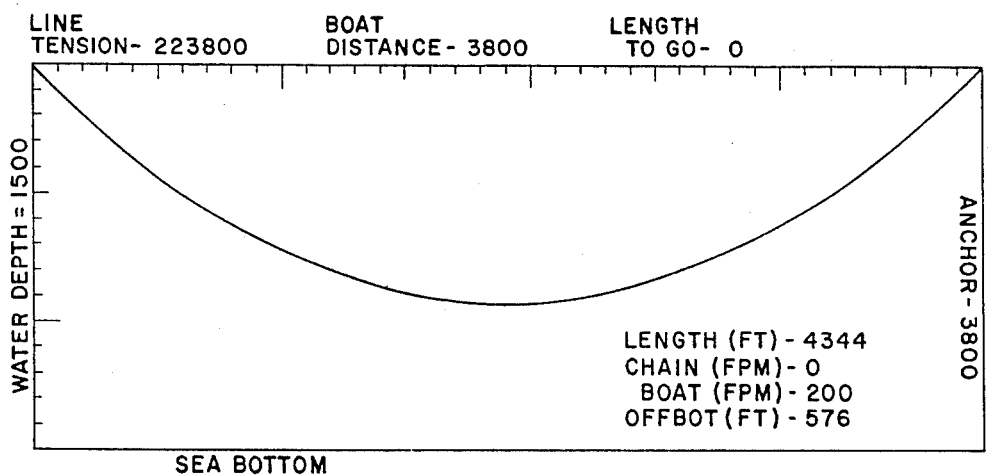
FIGS. 6, 7 and 8 are graphic displays involving a typical example in the deployment and setting of an anchor line utilizing the concepts of this invention.
Figure 2:
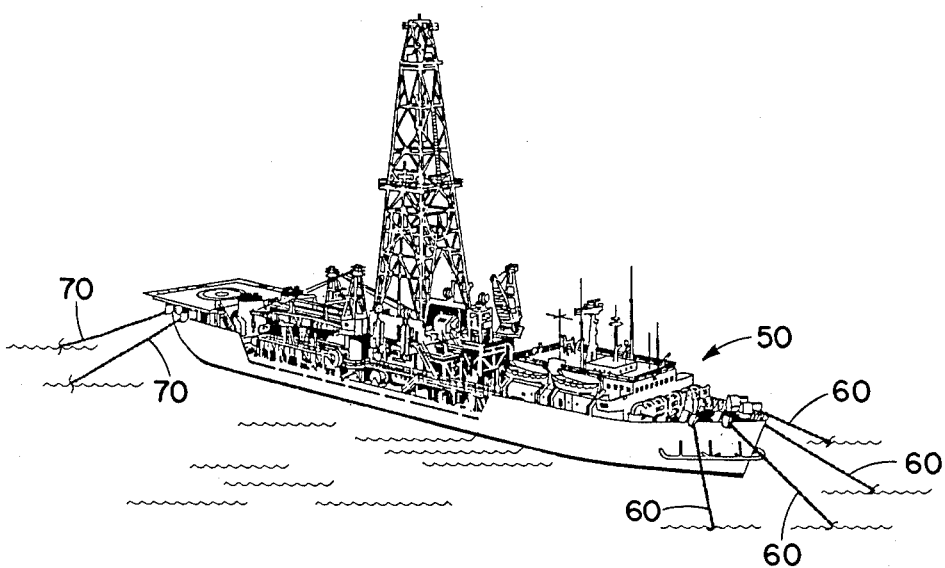
FIG. 2 is a representation of a floating type oil well drilling vessel showing the typical location of anchor lines therefrom.

Referring now to the drawings, in particular to FIG. 1, there is illustrated a vessel 10 anchored by means of a plurality of anchor lines 20 terminating at their lower end by anchors 30, each of which will have attached thereto a buoy 40 via a pendant line 42, shown at only one location in this view. The vessel 10 illustrated in FIG. 1 is a stabilized column-type semi-submersible offshore drilling vessel having stabilizing columns 11 located at least at each of its corners which connect the upper platform 12 with lower base structures 13 which are partially submerged when drilling. A drilling mast 14 and other equipment necessary for the drilling operation are located on platform 12. It would be appreciated, however, that the invention hereof may be utilized in conjunction with other types of offshore vessels such as that as shown in FIG. 2. The illustrated anchoring system in FIG. 1 is an eight point system. That is, a total of eight anchor lines are utilized with a pair of each extending from each of the four corners of the vessel 10. Located at each corner, where the anchor lines are stored will be found a windlass operator's cab 15 and a winch and/or windlass drive system 16. A riser tube 17 carries the drilling bit and pipe down into the ground during operation and further includes a blow-out preventer 18 all of which form no part of the invention but are here merely for illustrative purposes. In each of the columns 11 an anchor chain or line storage is provided which is fed therefrom around a windlass downwardly through a fairlead sheave 19 to the anchor 30.

In FIG. 2 a floating vessel 50 is shown depicting the plurality of anchor lines 60 from the bow and a plurality of lines 70 from the stern and is illustrated here merely for the purposes of showing another type of vessel where the method and apparatus of the invention is applicable.

Figure 3:
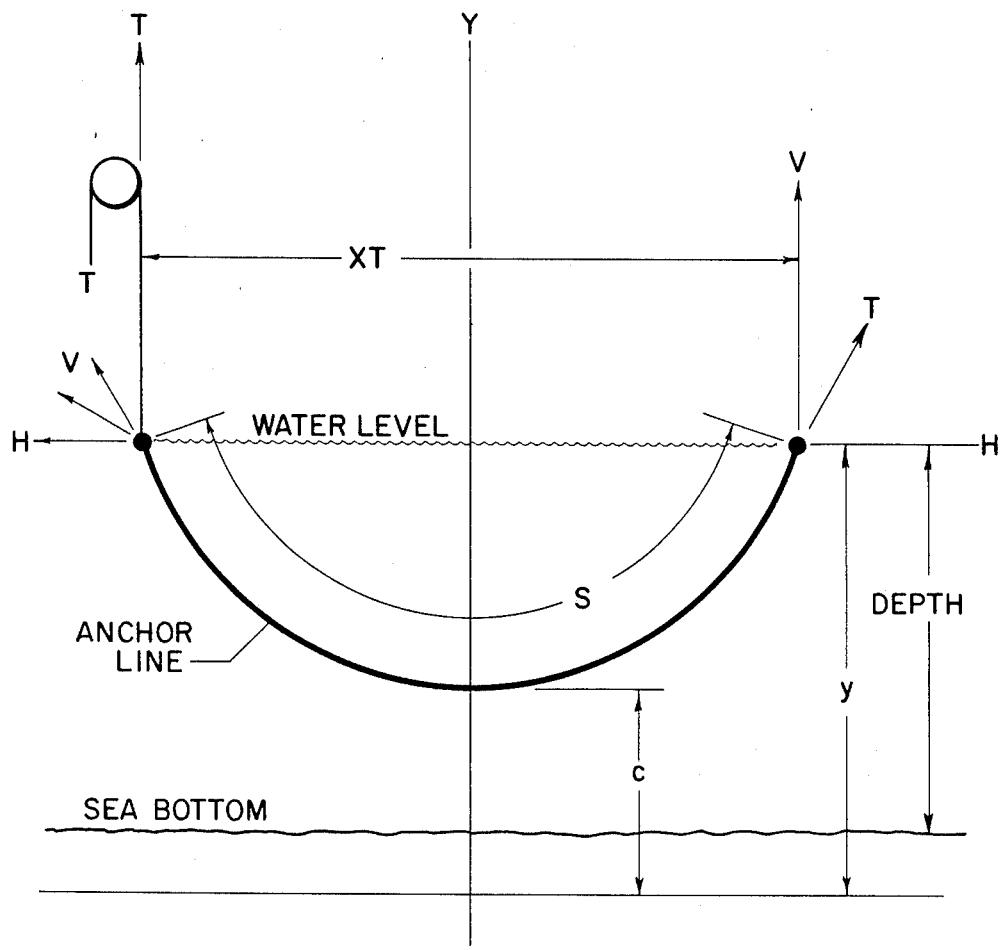
FIG. 3 is a schematic depicting the various factors involved with the catenary shape of an anchor line used in calculating the desired information.

FIG. 3 is depicted herein to illustrate the catenary shape of the anchor line suspended between a vessel and a support vessel or workboat and to describe the catenary mathematical equations utilizing the known values of tension in the anchor line and its length. The various mathematical equations involve calculating from x and y axis coordinates the distance between the vessel and workboat and the bollard pull acting on the workboat.

The y value (distance from x axis to water surface) can be determined since the weight per foot (w) of the line is known and the tension (T) at the water surface on workboat is measured.

$$y = T/W$$

From the measured line length (S) and y value, the catenary function (c) can be determined by:

$$y = \sqrt{((S)/2)^2 + c^2}$$

Transposing to the following form:

$$c = \sqrt{y^2 - ((S)/2)^2}$$

The distance between the rig and workboat (XT) can be determined by:

$$XT = c(\sinh^{-1})(S)/2c$$

The bollard pull or horizontal component and vertical component acting on the workboat can be determined by:

$$H = cS; \quad V = SW/2$$

Figure 4:
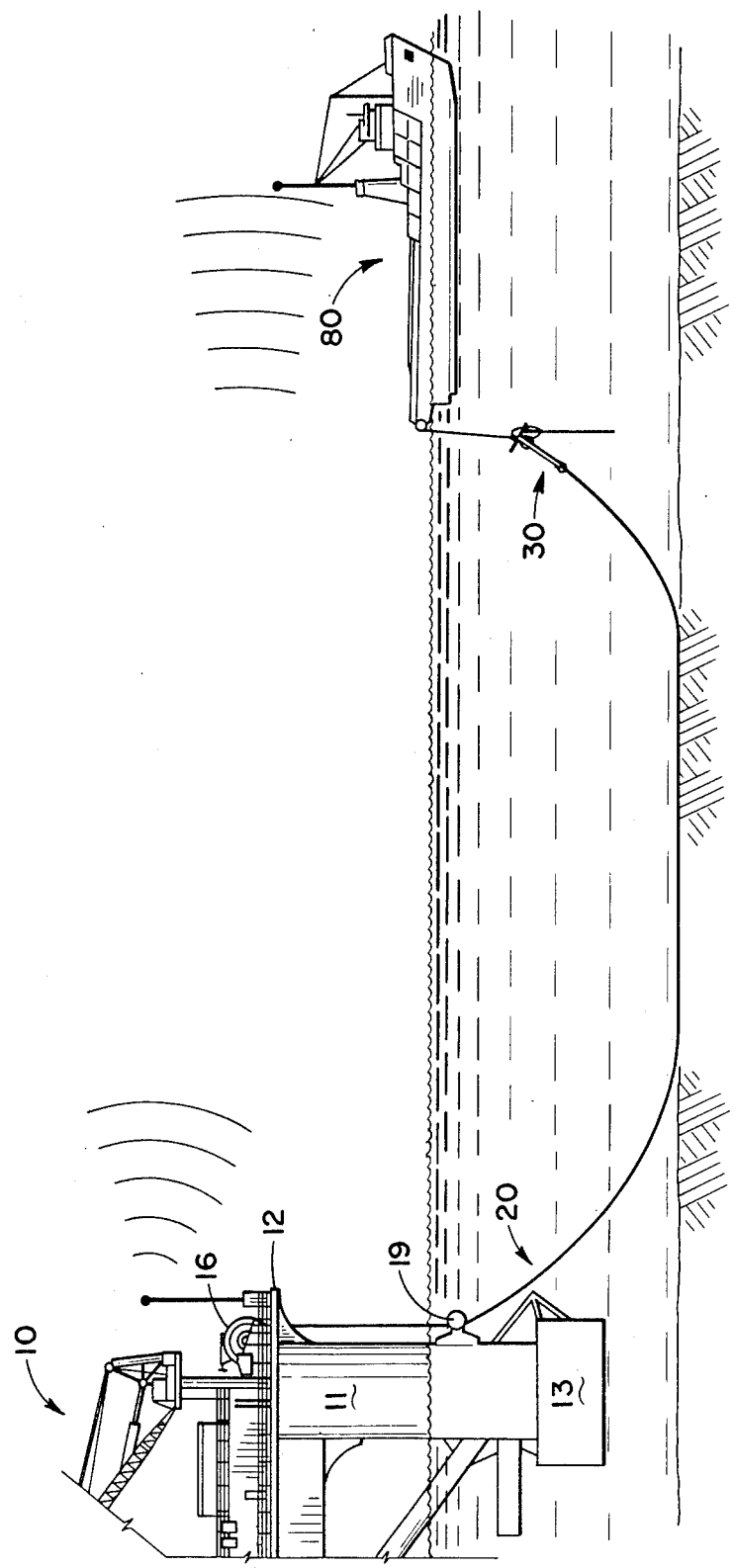
FIG. 4 depicts the method and apparatus involved in deploying an anchor line using workboats or support vessels.

FIG. 4 is provided herein to depict a typical method by which the anchor 30 is taken from the vessel 10 to its desired location utilizing a support vessel or workboat 80.

Figure 5:
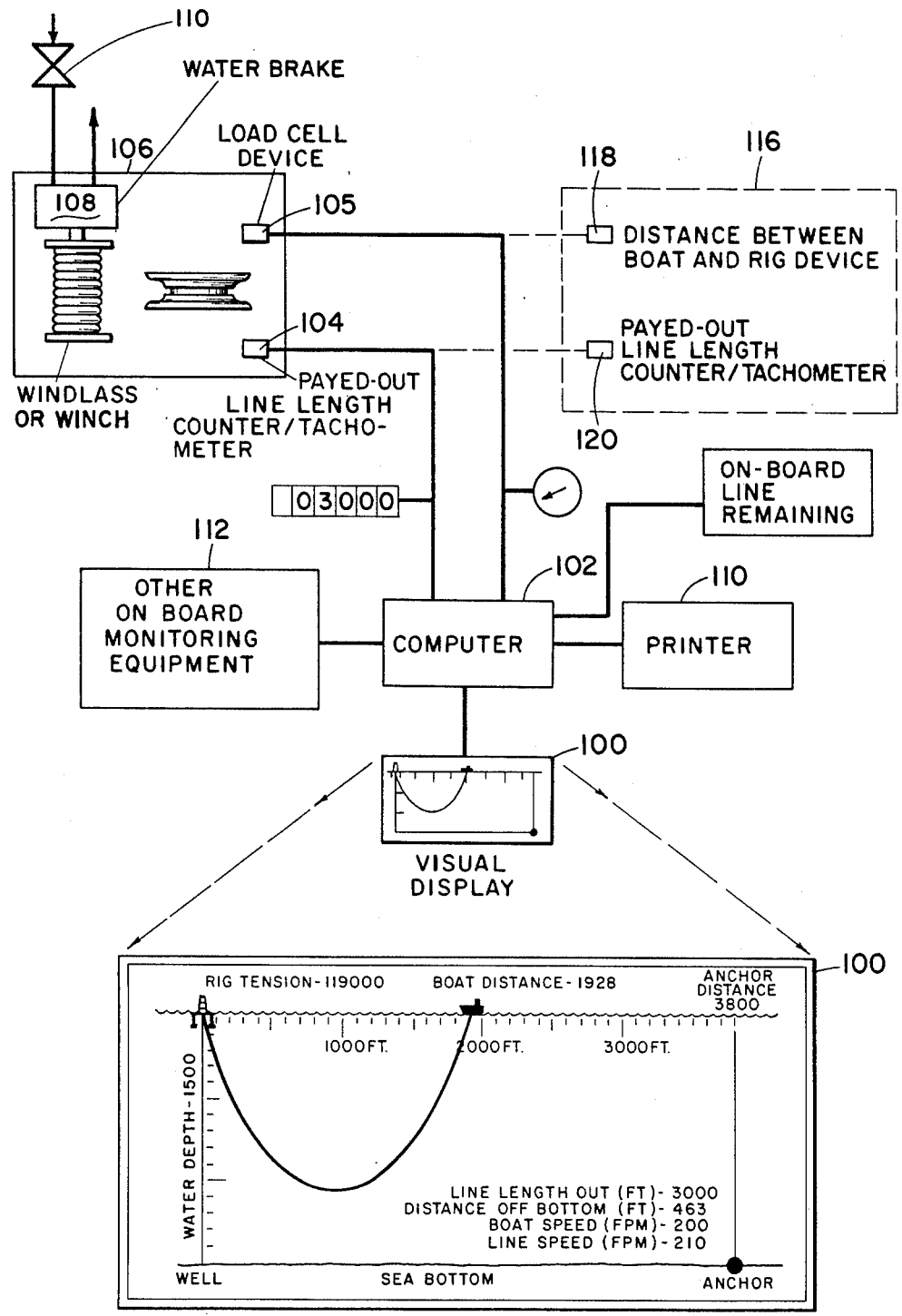
FIG. 5 is a schematic representation of the equipment, information and visual displays provided a windlass operator.

FIG. 5 is a schematic illustration of the equipment that would ordinarily be located in each of the windlass operator's cabs 15. The equipment would include a visual display such as a CRT cathode ray tube 100 which could also be constructed as an LED (light emitting diode), LCD (liquid crystal display) connected to a microprocessor or computer 102 which in turn is connected to a line length measuring device 104 and a load cell device 105 from the windlass or winch base 106. A water brake 108 is used to control the speed of the windlass by operation of valve 110. The equipment, in addition to a visual display can include a printer 110 and any and all other onboard monitoring equipment 112 which may be a necessary part of the computer 102. An auxiliary piece of equipment capable of providing the desired information to the windlass operator is shown within by the dotted line 116 including a means 118 for measuring the distance between the workboat 80 and the vessel 10. In addition, a line length device 120 would be also inclusive. In other words, for the apparatus and method of this invention to operate successfully, there must be input of the amount of line payed out or a line length device 104 and/or 120 in combination with a load cell device 105 and/or a means to measure the distance between the workboat and the vessel. The line length device could be a counter and could also include a line speed tachometer capable of transmitting an electrical signal such as a voltage or current proportional to the forces, or distance, and lengths being measured to the microprocessor or computer 102. The computer 102 is then capable of reading or sampling the electrical signals from the devices and quantatively converting these signals to a desired known value creating the visual and/or printed displays 100 as desired. The computer includes the necessary data base and/or software programs that incorporates all of the unknowns set forth by the equations set forth above from readings of the tension from the load cell device 105 or the distance between the vessel and workboat plus the amount of line payed out. In the visual display, graphical symbols can be used to continuously display the vessel, the workboat, water surface, sea bottom and desired anchor location. Continuous numerical displays of the anchor line tension, anchor line length, line speed, workboat distance, on-board line remaining, etc. is also inclusive.

The information and/or display 100 may be transmitted from the vessel 10 antenna 82 to workboat receiving antenna 84 by any form of radio or other audio or visual telemetry so that the workboat captain and the anchor line operator at the vessel can observe the same event.

The computer in operation, periodically reads the values of the measured devices and graphically displays the shape of the catenary curve between the vessel and the workboat. This is graphically displayed in FIGS. 6 AND 7 by observing the anchor handling monitor, the water surface and the workboat, the windlass operator is able to deploy the anchor line in accordance with a predetermined procedure, ideally to keep the anchor line from dragging the sea bottom. The heights and location of known structures along the sea bottom between the vessel and anchor location could also be input into the graphic display for the purposes of avoiding contact and eliminating the possibility of entanglement or damage as the anchoring process continues. The monitor would also indicate to the operator when the workboat had arrived at the determined distance or location of the anchor. Warning devices could be built into the system to avoid anchor line contact with the sea bottom, excessive tension, line overspeed, amount of line to the 'bitter end', etc, and could be permanently installed in each of the windlass operator's cabs, or be portable for use from operator's cab to operator's cab.

Figure 6:
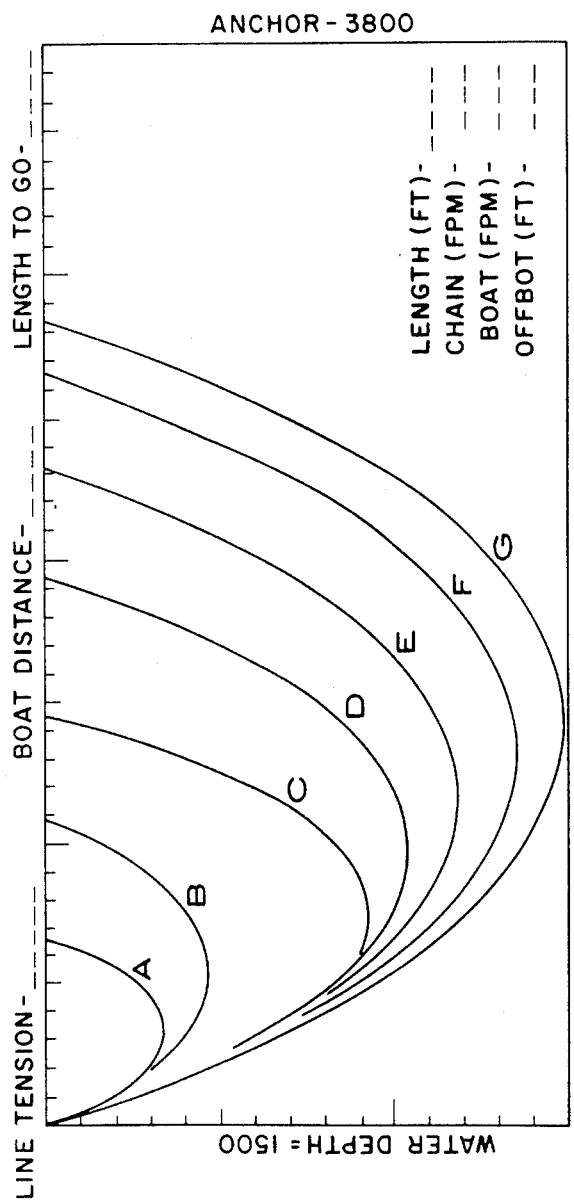
Figure 7:
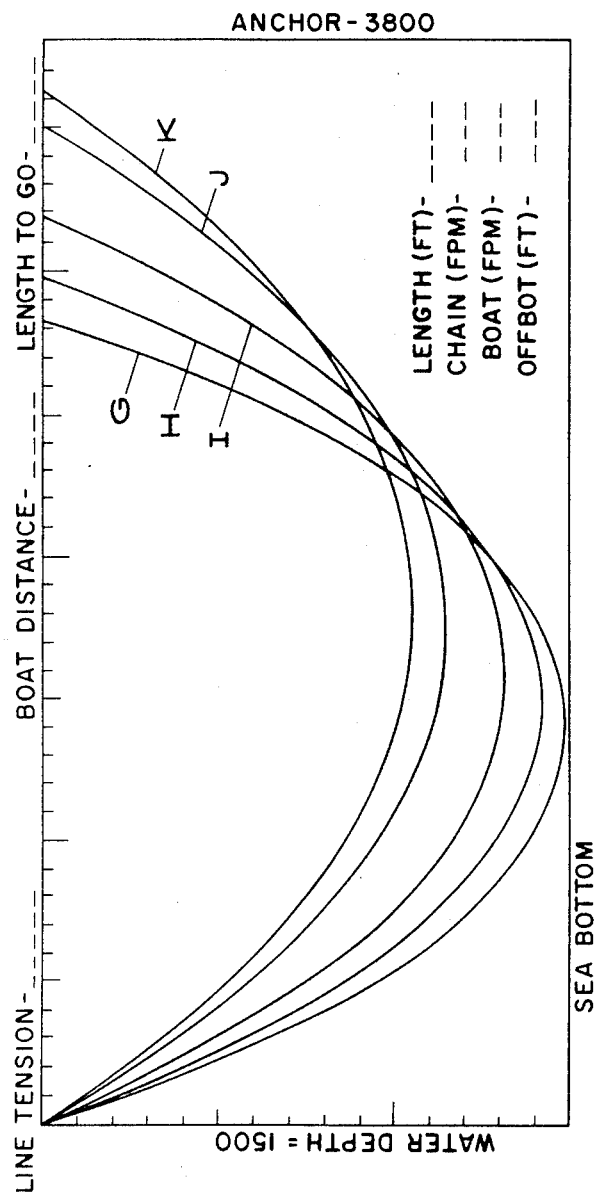

Although a variety of anchor line deployment methods may be utilized, in referring to FIGS. 6 and 7, as the workboat continued to move additional anchor line was payed out until point G which has been calculated as the total length of line necessary for the anchoring operatin. Thereafter, the workboat continued to the anchor location changing the catenary curvature as shown in FIG. 7.

Figure 9:
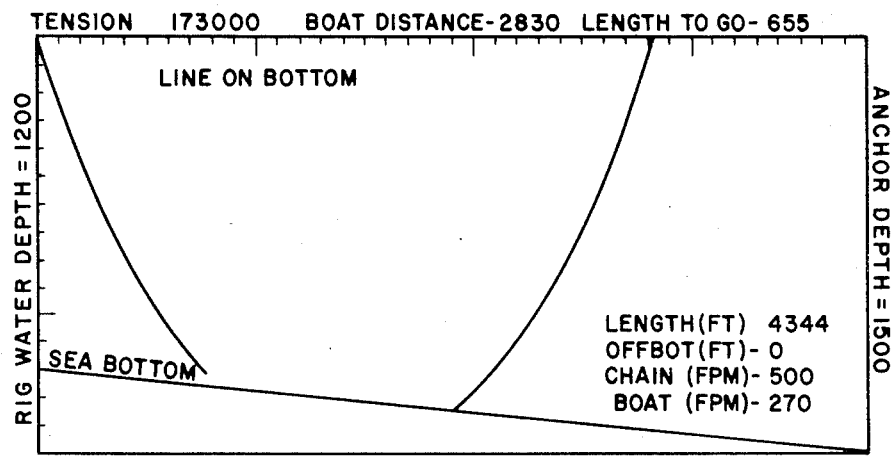
FIGS. 9 and 10 are graphic displays involved in the deployment and setting of an anchor in a sloping or variable depth sea bottom.
Figure 10:
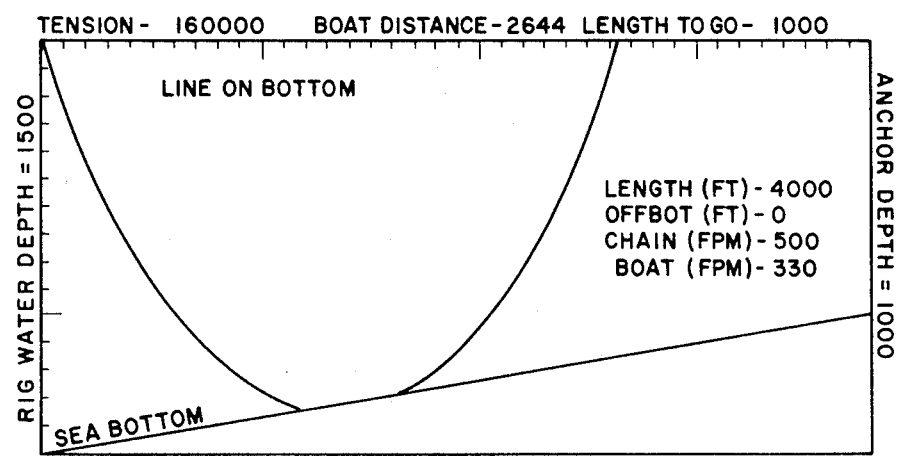

FIGS. 9 and 10 are illustrative of the calculated display where the sea bottom depth at the vessel and the ultimate anchor location are different. Thus the operator can control pay-out and/or the movement of the workboat to prevent the anchor line dragging the sea bottom.

What is claimed is:

1. A method for controlling the placement of an anchor and its anchor line to a known anchor drop point from a vessel to be anchored that is situated in a body of water such as the ocean and utilizing an anchor handling support vessel with the aid of a digital computer mathematically programmed to at least calculate at different intervals, distances between said vessel and said anchor handling support vessel (XT) and bollard pull (H) acting on said workboat, comprising:

providing said computer with data that includes location of said anchor drop point from said vessel, the depth and contours of the ocean bottom from said vessel to said anchor drop point the weight per foot of said anchor line, and the total length of said anchor line to be payed out, constantly monitoring at said different intervals the distance between said vessel and said anchor handling support vessel and the length of said anchor line payed out by said anchor handling support vessel, providing said computer with said monitored information as to said distance between said vessel and said support vessel and the length of said anchor line payed out, repetitively calculating in said computer, at desired intervals, the catenary curvature of said anchor line at each of said intervals, and separately controlling the speed of payout of said anchor line to maintain a catenary curvature thereof that prevents undue strain upon said anchor line beyond its breaking strength and excessive bollard pull upon said support vessel.

2. A method for controlling the placement of an anchor and its anchor line to a known anchor drop point from a vessel to be anchored that is situated in a body of water such as the ocean and utilizing an anchor handling support vessel with the aid of a digital computer mathematically programmed to at least calculate at different intervals, distances between said vessel and said anchor handling support vessel (XT) and bollard pull (H) acting on said workboat, comprising:

providing said computer with data that includes location of said anchor drop point from said vessel, the depth and contours of the ocean bottom from said vessel to said anchor drop point, the weight per foot of said anchor line and the total length of said anchor line to be payed out, constantly monitoring at said different intervals the tension upon and the length of said anchor line payed out by said anchor handling support vessel, providing said computer with said monitored information as to said tension and length of said anchor line payed out, repetitively calculating in said computer, at desired intervals, the catenary curvature of said anchor line at each of said intervals, and separately controlling the speed of payout of said anchor line to maintain a catenary curvature thereof that prevents undue strain upon said anchor line beyond its breaking strength and excessive bollard pull upon said support vessel.

3. The method of claim 2 wherein said vessel is a floating vessel.

4. The method of claim 2 wherein said vessel is a semi-submersible drilling platform.

5. The method of claim 2 wherein the said data includes the total length of said anchor line on board said vessel to be anchored.

6. The method of claim 2 including the step of creating a visual display of said catenary curvature of said anchor line that has been payed out relative to said depth of the ocean bottom and the location of said support vessel.

7. The method of claim 6 wherein said visual display is on a cathode ray tube.

8. The method of claim 6 wherein said visual display is a printed display.

9. The method of claim 6 including the step of telemetering or transmitting said visual display to said anchor handling support vessel.

10. An apparatus for controlling the placement of an anchor and its anchor line to a known anchor drop point from a vessel to be anchored that is situated in a body of water such as the ocean and utilizing an anchor handling support vessel with the aid of a digital computer mathematically programmed to at least calculate at different intervals, distances between said vessel and said anchor handling support vessel (XT) and bollard pull (H) acting on said workboat, comprising:

said computer having a data base means programmed to receive data that includes location of said anchor drop point from said vessel, the depth and contour of the ocean bottom from said vessel to said anchor drop point, the weight per foot of said anchor line, and the total length of said anchor line electrical signal means to monitor at said different intervals of time the distance between said vessel and said anchor handling support vessel and the length of said anchor line, means to provide said computer with said monitored information as to said distance between said vessel and said anchor handling support vessel and the length of said anchor line, means to repetitively calculate in said computer, at said desired intervals, the catenary curvature of said anchor line at each of said intervals, and brake means to control the speed of payout of said anchor line to maintain a catenary curvature thereof that prevents undue strain upon said anchor line beyond its breaking strength and excessive bollard pull upon said support vessel.

11. An apparatus for controlling the placement of an anchor and its anchor line to a known anchor drop point from a vessel to be anchored that is situated in a body of water such as the ocean and utilizing an anchor handling support vessel with the aid of a digital computer mathematically programmed to at least calculate at different intervals, distances between said vessel and said anchor handling support vessel (XT) and bollard pull (H) acting on said workboat, comprising:

said computer having data means that includes location of said anchor drop point from said vessel, the depth of the ocean bottom from said vessel to said anchor drop point, the weight per foot of said anchor line, and the total length of said anchor line, electrical signal means to monitor at said different intervals of time the tension upon the length of said anchor line, means to provide said computer with said monitored information as to said tension and length of said anchor line, means to repetitively calculate in said computer, at said desired intervals, the catenary curvature of said anchor line at each of said intervals, and brake means to control the speed of payout of said anchor line to maintain a catenary curvature thereof that prevents undue strain upon said anchor line beyond its breaking strength and excessive bollard pull upon said support vessel.

12. Apparatus of claim 11 wherein said vessel is a floating vessel.

13. Apparatus of claim 11 wherein said vessel is a semi-submersible drilling platform.

14. Apparatus of claim 11 wherein said data includes the total length of said anchor line on board said vessel to be anchored.

15. Apparatus of claim 11 including visual display means of said catenary curvature of said anchor line that has been payed out relative to said depth of the ocean bottom and the location of said support vessel.

16. Apparatus of claim 15 wherein said visual display is a cathode ray tube.

17. Apparatus of claim 15 wherein said visual display is a printed display.

18. Apparatus of claim 15 including means to telemeter or transmit said visual display to said anchor handling support vessel.

* * * * *

UNITED STATES PATENT AND TRADEMARK OFFICE
CERTIFICATE OF CORRECTION

PATENT NO.  : 4,755,947

DATED       : July 5, 1988

INVENTOR(S) : Steven A. Braschler; Frederick G. Houghland

It is certified that error appears in the above-identified patent and that said Letters Patent is hereby corrected as shown below:

Column 1, Line 21 - "environmental fores" should read --environmental forces--

Column 2, Line 23 - "'feel°'" should read --'feel'--

Column 3, Line 38 - "invention is detail" should read --invention in detail--

Column 5, Line 16, "quantatively" should read --quantitatively--

Column 5, Line 62, "operatin" should read --operation--

Signed and Sealed this

Twenty-fourth Day of January, 1989

Attest:

DONALD J. QUIGG

*Attesting Officer*     *Commissioner of Patents and Trademarks*